(12) United States Patent
Deckard et al.

(10) Patent No.: US 7,258,896 B2
(45) Date of Patent: Aug. 21, 2007

(54) PREPARING COMPOSITES BY USING RESINS

(75) Inventors: Luisa M. Deckard, College Station, TX (US); Jennifer J. Zinck, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 475 days.

(21) Appl. No.: 10/274,840

(22) Filed: Oct. 18, 2002

(65) Prior Publication Data

US 2003/0094734 A1  May 22, 2003

Related U.S. Application Data

(60) Provisional application No. 60/336,203, filed on Oct. 22, 2001.

(51) Int. Cl.
*B05D 5/00* (2006.01)
*B29C 65/00* (2006.01)
*B29C 35/08* (2006.01)

(52) U.S. Cl. ............ 427/256; 427/258; 427/271; 427/496; 156/272.8; 156/273.3; 156/290; 156/275.5; 264/425

(58) Field of Classification Search ......... 156/307.3, 156/313, 244, 219, 77, 272.8, 273.3, 290, 156/275.5, 273.5, 275.1; 264/45.3, 145, 264/46.2, 46.5, 50, 293, 912, 425, 488, 454, 264/477; 427/256, 258, 271, 496, 180
See application file for complete search history.

(56) References Cited

U.S. PATENT DOCUMENTS 3,770,537 A * 11/1973 Elton .................... 156/77

(Continued)

FOREIGN PATENT DOCUMENTS

EP        0 467 100 A1    1/1992

OTHER PUBLICATIONS

Goodman, D.L., et al., "Automated Tape Placement with In-Situ Electron Beam Cure," *44th International SAMPE Symposium*, pp. 269-280 (May 23-27, 1999).

*Primary Examiner*—N. Edwards
(74) *Attorney, Agent, or Firm*—Ladas & Parry (57) ABSTRACT

A method for making a part, the method comprising: (a) providing an uncured upper layer on a part, a substrate, a workpiece, a support platform, or a base layer, wherein the uncured upper layer comprises resin and also comprises fibers, particles, powder, and/or electronic devices; (b) optionally providing a new uncured upper layer on the uncured upper layer provided in step (a), whereby the uncured upper layer provided in step (a) becomes an uncured lower layer, and wherein the new uncured upper layer comprises resin and also comprises fibers, particles, powder, and/or electronic devices; (c) curing the uncured upper layer and/or the uncured lower layer after step (b) using an electron beam; (d) after step (c), providing a new uncured upper layer on the cured or uncured upper layer, whereby the cured or uncured upper layer becomes a cured or uncured lower layer, and wherein the new uncured upper layer comprises resin and also comprises fibers, particles, powder, and/or electronic devices; (e) optionally curing the lower layer resulting from step (d) if the lower layer is uncured to yield a cured lower layer; (f) after step (e), optionally providing a new uncured upper layer on the uncured upper layer provided in step (d), whereby the uncured upper layer provided in step (d) becomes an uncured lower layer, and wherein the new uncured upper layer comprises resin and also comprises fibers, particles, powder, and/or electronic devices; (g) after step (f) curing the uncured upper layer and/or the uncured lower layer(s) after step (f) using an electron beam; and (h) optionally repeating steps (d) through (g) a number of times to form a desired number of cured layers.

70 Claims, 4 Drawing Sheets

U.S. PATENT DOCUMENTS

| | | | |
|---|---|---|---|
| 4,575,330 A | 3/1986 | Hull | 425/174.4 |
| 5,264,061 A | 11/1993 | Juskey et al. | 156/214 |
| 5,344,893 A * | 9/1994 | Asai et al. | 525/398 |
| 5,447,996 A * | 9/1995 | Asai et al. | 525/398 |
| 5,730,817 A | 3/1998 | Feygin et al. | 156/64 |
| 5,846,461 A * | 12/1998 | Collins et al. | 264/45.3 |
| 5,876,550 A | 3/1999 | Feygin et al. | 156/264 |
| 5,877,229 A | 3/1999 | Janke et al. | 522/31 |
| 6,440,257 B1 * | 8/2002 | Zhou et al. | 156/307.3 |
| 6,508,910 B2 * | 1/2003 | Zhou et al. | 156/307.3 |
| 6,890,635 B2 * | 5/2005 | Lin et al. | 428/295.1 |
| 7,192,654 B2 * | 3/2007 | Andresakis et al. | 428/626 |
| 2006/0105144 A1 * | 5/2006 | Fracasso | 428/151 |

* cited by examiner

PREPARING COMPOSITES BY USING RESINS

CROSS REFERENCE TO RELATED APPLICATION

This application claims the benefit under 35 U.S.C. § 119(e) to co-pending U.S. Patent Application No. 60/336,203 (filed Oct. 22, 2001), the contents of which are hereby expressly incorporated herein in their entirety by this reference.

BACKGROUND

This invention involves preparing composite parts by using an electron beam to selectively cure an electron-beam-curable thermoset resin. The invention advances the art in two related technical areas: fabrication of organic-matrix composites and rapid prototyping.

Fabrication of Advanced Organic-Matrix Composites

High-performance thermoset-matrix composite parts are used extensively in military aircraft, commercial aircraft, space vehicles, and sporting goods; and their use is expanding as manufacturing techniques improve and costs are reduced. These materials contain a high volume fraction (greater than about 50%) of continuous fiber reinforcement, which helps to give the materials the required strength and stiffness. There are a variety of methods for fabricating shaped parts from continuous fiber-reinforced plastic parts, including prepreg layup, resin transfer molding, pultrusion and compression molding, but all require the use of a tool (a mold, die, mandrel, etc.) to give the part its shape. (The term "pultrusion" comes from a combination of the words "pulling" and "extrusion." Fibers and resin are pulled through a die of a desired shape. This is used to make long parts of continuous cross section, such as rods or beams.)

The tool mentioned in the preceding paragraph is typically made of a metal (e.g., aluminum, steel, or Kovar, depending on the part shape) or composite and may require months and many thousands of dollars to make, depending on the complexity and size of the part. (Kovar is a nickel-cobalt alloy with a low thermal expansion coefficient, which makes Kovar useful for tooling for curing composites because a low amount of tool expansion during heating or curing of the composite part limits stress on the part, while a large amount of tool expansion during heating or curing of the composite part can stress the part. Instead of Kovar, any other suitable low-expansion alloy may be used.) The time and cost required to make a tool can be a major impediment in the fabrication of composite parts for prototyping or small production runs, where quick response times can be crucial and the cost of the tool cannot be amortized over many parts.

Electron-beam curing, which is also known as "e-beam curing," is a relatively new method for curing composite materials that has stimulated significant interest. Curing a part using an e-beam allows curing at low temperatures and much faster cycle times, which reduces processing costs, equipment costs, and tooling costs. Current e-beam curing processes either utilize a high-energy beam (typically 2 to 10 MeV) to cure the entire thickness of the part (that has been laid up over a tool or injected into a tool such as a mold) at one time, or use a lower energy beam (e.g., 300 to 400 keV) to cure one ply of pre-impregnated fiber as it is layed down over a shaped tool. All these approaches require the fabrication of a tool.

The subject invention can eliminate the need to use a tool (such as a mold, die, mandrel, or any other type of tool) to make a continuous fiber-reinforced composite part. A three-dimensional part can be made directly from a computer design file, using the same raw material that is kept on hand for fabricating any composite part, regardless of shape and design. (Of course, the raw materials used would have to be consistent with the requirements of this invention.) This capability could dramatically decrease response time and the cost to fabricate prototypes or small quantities of parts.

Rapid Prototyping

Rapid prototyping (also called "desktop manufacturing" or "free-form fabrication") has been a very active area in the last 15 years, with a variety of approaches in use or under development. Stereolithography (SLA), as described in U.S. Pat. No. 4,575,330 (which is incorporated herein by this reference), was one of the earliest rapid prototyping methods and utilizes a laser-generated ultraviolet (UV) beam to selectively cure UV-curable acrylate resins. However, the available UV-curable resins have much lower mechanical properties (strength, toughness, glass transition temperature, etc.) than most recently developed electron-beam-curable resins; and since UV radiation does not penetrate the material as deeply, especially when carbon fibers are included, it cannot be used to fabricate carbon-fiber-reinforced composites with thermal and mechanical properties that would be obtainable using the subject invention. Selective Laser Sintering (SLS) was also an early rapid-prototyping method; it operates by using a laser to selectively fuse powder of the working material, adding another layer of powder, and building a part up in this manner. An important advantage of SLS compared to many other techniques is its ability to use a variety of materials, including wax, nylon, polycarbonate, and even (in a limited way) metal. However, SLS does not work well on thermoset plastics (which tend to have superior mechanical and thermal properties compared to thermoplastics), since these materials cannot be melted without significant chemical degradation once they have been cured. Other rapid-prototyping methods include: Three-Dimensional Printing, in which a binder is sprayed in controlled manner onto a bed of particles; Fused Deposition Modeling, in which a thermoplastic filament is melted and applied similarly to squeezing toothpaste from a tube; and other approaches. However, none of these rapid-prototyping approaches is capable of fabricating a thermoset plastic part with thermal and mechanical properties similar to epoxy.

A continuous fiber-reinforced organic-matrix material consists of a resin made of organic material (such as a thermoplastic or thermoset, as opposed to ceramic or metal) which is reinforced by long aligned fibers (e.g., fibers having any suitable size, including, but not necessarily limited to, fibers having a median length of at least about 2 cm, at least about 2.5 cm, at least about 2.6 cm, at least about 3 cm, at least about 4 cm, at least about 5 cm, at least about 10 cm, at least about 13 cm, at least about 15 cm, or at least about 20 cm and optionally having a median length of less than about 50 m, less than about 25 m, less than about 10 m, less than about 5 m, less than about 200 cm, less than about 150 cm, less than about 100 cm, less than about 50 cm, or less than about 25 cm), which optionally extend approximately over the length, width, or depth of the part (these may be straight fibers or fibers woven into a fabric and may have a size approximately equal to the length, width, or depth of the part). By contrast, a discontinuous fiber-reinforced composite is reinforced by small fibers, typically less than about 2 cm long, which are often oriented randomly but may also be aligned. Because the reinforcing fibers are much stronger and stiffer than the organic matrix, and because longer fibers can better carry and distribute mechanical loading, a part reinforced by continuous fibers is much stronger and stiffer than a part reinforced by short fibers. However, fabricating parts reinforced with long, oriented fibers is more difficult, especially when trying to use a rapid-prototyping method.

Our invention is different from current rapid-prototyping methods (with the possible exception of Laminated Object Manufacturing (LOM)) in its ability to combine two capabilities which together produce parts with mechanical and thermal properties that are dramatically superior to those that can be made with existing rapid-prototyping methods:

1) the ability to incorporate continuous (i.e., long, not short) carbon (not glass) fibers as the reinforcement; and
2) the ability to use thermoset (rather than thermoplastic) resins as the matrix.

As discussed above, other rapid-prototyping methods (with the possible exception of LOM) may have one or the other of the above capabilities, but none can incorporate both the ability to use continuous carbon fibers and the ability to use a thermoset matrix to make a composite part.

Laminated Object Manufacturing (LOM) is described in U.S. Pat. Nos. 5,730,817 and 5,876,550. As currently practiced, LOM uses heat, not an electron beam, to bond together layers of material that have been cut by a computer-controlled laser. The invention described in this application differs from LOM and, as explained below, has several advantages over LOM:

(1) Because each layer is simultaneously formed and bonded to the previous layer in the present invention, the integrity of the bonding between layers will be better in the present process than in LOM; and, thus, the present process will yield a higher quality product with fewer voids and better mechanical properties. This is especially important because there is no flow of the e-beam curable matrix during cure.

(2) Because the present process does not require that layers be formed separately and then picked up and placed onto the workpiece, the present process is more flexible than LOM. For example, the present process allows reinforcement only in selected areas, thereby allowing formation of very thin layers and avoiding indexing issues that can contribute to dimensional inaccuracies.

(3) Because reinforcing fibers for one or more layers can be laid down before introduction and curing of the e-beam curable resin matrix in the present invention (by contrast with LOM), introduction of z-direction reinforcing short fibers can be accomplished; and those fibers can then be immersed in resin and the surrounding resin cured, thereby completely integrating the z-direction fibers into the part.

SUMMARY

The subject invention will allow the fabrication of high-performance thermoset-plastic parts with reinforcing fibers directly from a computer-design file without requiring the separate fabrication of tooling. Because the parts can be fabricated from high-performance thermoset plastics, the superior mechanical and thermal properties of the parts will allow a much wider application of rapid-prototyping technology than has been possible until now. This method can also be used to make inexpensive composite tooling with very short lead times. Previous rapid prototyping technologies could not fabricate parts with the high-temperature mechanical properties required for most composite-tooling applications; and previous technologies could not incorporate continuous fibers in a structural organic matrix to give the level of strength and stiffness available using the subject invention.

BRIEF DESCRIPTION OF THE DRAWINGS

FIG. 3 shows resin being infused into the lowest layer of fiber or fabric and shows an electron beam selectively curing areas to solidify the resin in desired locations. FIG. 3 also shows that an inflatable bladder may be used to compress the fiber layers during curing.

DESCRIPTION

This invention involves preparing plastic or composite parts by using an electron beam (e-beam) to selectively cure an electron-beam-curable thermoset resin. The e-beam optionally may be a low-energy beam (e.g., about 100 to about 1000 keV, about 200 to about 500 keV, or about 300 to about 400 keV), optionally may deliver a suitable radiation dose (e.g., about 100 KGy to about 300 kGy, or about 150 kGy to about 250 kGy, or about 175 kGy to about 225 kGy), and optionally may be computer-controlled; and the resin may contain continuous and/or discontinuous reinforcing fibers. The e-beam initiates polymerization and crosslinking (i.e., chemical curing) of the e-beam-curable resin. By using the present invention, a three-dimensional fiber-reinforced part may be built up layer by layer, without the need for a tool or mold.

A variety of plastic or composite parts can be made using this invention, including unreinforced plastic parts (which would not be composites) and composite parts with various types of reinforcements (e.g., particles, discontinuous fibers, and/or continuous fibers, etc.); however, a unique aspect of this invention is the ability to fabricate high-quality continuous fiber-reinforced thermoset parts optionally without the use of a tool or a mold.

Plastic or composite parts made by the present invention may have the following mechanical and thermal properties. For example, the parts may have a tensile strength in the direction generally parallel to the reinforcing fibers at approximately room temperature (e.g., about 18° C. (65° F.) to about 24° C. (75° F.)) of about 500 MPa to about 3,000 MPa, or about 1,000 MPa to about 3,000 MPa, or about 1,500 MPa to about 2,700 MPa. The parts may have a tensile modulus in the direction generally parallel to the reinforcing fibers at approximately room temperature (e.g., about 18° C. (65° F.) to about 24° C. (75° F.)) of about 50 GPa to about 220 GPa, or about 90 GPa to about 200 GPa, or about 120 GPa to about 180 GPa. The parts may have a flexural strength in the direction generally parallel to the reinforcing fibers at approximately room temperature (e.g., about 18° C.

(65° F.) to about 24° C. (75° F.)) of about 600 MPa to about 2,000 MPa, or about 700 MPa to about 1,800 MPa, or about 800 MPa to about 1,800 MPa. The parts may have a resin glass transition temperature of about 160° C. to about 400° C., or about 170° C. to about 390° C., or about 180° C. to about 380° C. Finally, after exposure to water at approximately 74° C. for about seven days, the parts may have a tensile strength in the direction generally parallel to the reinforcing fibers at approximately room temperature (e.g., about 18° C. (65° F.) to about 24° C. (75° F.)) of about 500 MPa to about 3,000 MPa, or about 1,000 MPa to about 3,000 MPa, or about 1,500 MPa to about 2,700 MPa.

Method 1

A fiber-reinforced thermoset part (or, more broadly, a plastic or composite part) according to the present invention may be built up by method 1: (a) laying down a thin layer (e.g., having a thickness of about 0.01 mm to about 0.5 mm, or a thickness of about 0.05 mm to about 0.4 mm, or a thickness of about 0.1 mm to about 0.25 mm, or any other suitable thickness) of discontinuous (e.g., chopped, etc.) fibers, continuous fibers, particles/powder (e.g., ceramic, metal, etc.), small (e.g., having a maximum diameter of about 20 microns to about 2 cm, or about 40 microns to about 10 mm, or about 100 microns to about 2 mm) electronic devices (such as piezoelectric sensors or actuators, optical fibers, integrated chips, and other electronic devices), any other suitable materials, and/or combinations thereof; (b) applying a resin to wet the thin layer to form a resin-wetted layer; (c) optionally repeating steps (a) and (b) to form another resin-wetted layer; (d) selectively curing one or more of the resin-wetted layers via an e-beam to form a cured layer or cured layers; (e) repeating steps (a) through (d) to form a new cured layer or new cured layers; and (f) optionally repeating step (e) a number of times to form the desired number of cured layers.

In step (a) of method 1, the thin layer may be laid down upon a part, substrate, a workpiece, or support platform (such as the movable support platform shown in FIG. 1); or the thin layer may be laid down upon a resin-wetted layer or a cured layer that is supported on or comprises a portion of a part, substrate, workpiece, or support platform. In step (b) of method 1, the resin may be applied to the thin layer by any suitable method, for example by spraying the thin layer with resin or lowering the thin layer into a pool (or bath) of resin (e.g., by lowering slightly or incrementally the part, substrate, workpiece, or support platform that supports the thin layer) or by raising a pool (or bath) of resin to cover or soak the thin layer.

In step (f) of method 1, step (e) may be repeated any number of times until a portion of the part is completed or until all of the part is completed (e.g., at least about one time, at least about two times, at least about three times, at least about four times, at least about five times, at least about 10 times, at least about 20 times, at least, about 25 times, at least about 30 times, at least about 40 times, at least about 50 times, at least about 75 times, at least about 100 times, at least about 250 times, at least about 500 times, or any other suitable number of times).

In step (d) of method 1 and in step (e) of method 1 when step (d) is repeated, "selectively curing one or more of the resin-wetted layers" means curing those portions of the resin-wetted layer(s) that are intended to form the final part and optionally not curing some, most, or all of those portions of the resin-wetted layers that are not intended to form the final part. After step (d), (e), or (f) in method 1, some, most, or all of the uncured material optionally is removed from the part by any suitable process. The uncured material includes, but is not necessarily limited to, the uncured resin and the material (such as discontinuous and continuous fibers, particles/powder, small electronic devices, and other materials) that is not surrounded by cured resin. For example, the uncured resin may be allowed to drain off of the part; or a suitable solvent or heat may be applied to the uncured resin to facilitate removal of the uncured resin. Similarly, the material that is not surrounded by cured resin may be removed from the part by any suitable process (e.g., a process that subjects fibers to a twisting stress, which causes the fibers to break easily at the surface of the complete part). For example, to break fibers or remove other materials that are not surrounded by cured resin, the part may be manually scrubbed with a fine wire brush, or a light blasting process may be used (using media such as plastic pellets, which are commonly used to remove paint from plastic surfaces).

In addition, in step (e) of method 1 when step (d) is repeated, "selectively curing one or more of the resin wetted layers" means that the resin-wetted layer or layers are cured and in the same step (e.g., at the same time or simultaneously) are also bonded to one or more previously cured layers.

Method 2

Alternatively, a fiber-reinforced thermoset part (or, more broadly, a plastic or composite part) according to the present invention may be built up by method 2: (a) preparing a mixture by mixing a liquid resin with discontinuous (e.g., chopped, etc.) fibers, continuous fibers, particles/powder (e.g., ceramic, metal, etc.), small electronic devices, any other suitable materials, and/or combinations thereof; (b) laying down a thin layer (e.g., having a thickness of about 0.01 mm to about 0.5 mm, or a thickness of about 0.05 mm to about 0.4 mm, or a thickness of about 0.1 mm to about 0.25 mm, or any other suitable thickness) of the resulting mixture; (c) optionally repeating step (b) to form another thin layer; (d) selectively curing one or more of the thin layers via an e-beam to form a cured layer or cured layers; (e) repeating steps (b) through (d) to form a new cured layer or new cured layers; and (f) optionally repeating step (e) a number of times to form the desired number of cured layers.

In step (b) of method 2, the thin layer of the mixture may be laid down upon a part, substrate, workpiece, or support platform (such as the movable support platform shown in FIG. 1); or the thin layer of the mixture may be laid down upon a cured, partially cured, or uncured (thin) layer that is supported on or comprises a portion of a part, substrate, workpiece, or support platform. In step (b) of method 2, the thin layer of the mixture may be laid down on the part, the substrate, the workpiece, or the support platform or on the cured, partially cured, or uncured (thin) layer by any suitable method—for example, by spraying the thin layer of the mixture on the part, on the substrate, on the workpiece, on the support platform, or on the cured, partially cured, or uncured (thin) layer; by lowering slightly or incrementally into a pool (or bath) comprising the mixture the part, the substrate, the workpiece, the support platform, or the cured, partially cured, or uncured (thin) layer that is supported on or comprises a portion of a part, substrate, workpiece, or support platform; or by raising a pool (or bath) comprising the mixture to cover or soak the part, the substrate, the workpiece, the support platform, or the cured, partially cured, or uncured (thin) layer that is supported on or comprises a portion of a part, substrate, workpiece, or support platform.

In step (f) of method 2, step (e) may be repeated any number of times until a portion of the part is completed or until all of the part is completed (e.g., at least about one time, at least about two times, at least about three times, at least about four times, at least about five times, at least about 10 times, at least about 20 times, at least about 25 times, at least about 30 times, at least about 40 times, at least about 50 times, at least about 75 times, at least about 100 times, at least about 250 times, at least about 500 times, or any other suitable number of times).

In step (d) of method 2 and in step (e) of method 2 when step (d) is repeated, "selectively curing one or more of the thin layers" means curing those portions of the thin layer(s) that are intended to form the final part and optionally not curing some, most, or all of those portions of the thin layers that are not intended to form the final part. After step (d), (e), or (f) in method 2, some, most, or all of the uncured material optionally is removed from the part by any suitable process. The uncured material includes, but is not necessarily limited to, the uncured resin and the material (such as discontinuous and continuous fibers, particles/powder, small electronic devices, and other materials) that is not surrounded by cured resin. For example, the uncured resin may be allowed to drain off of the part; or a suitable solvent or heat may be applied to the uncured resin to facilitate removal of the uncured resin. Similarly, the material that is not surrounded by cured resin may be removed from the part by any suitable process (e.g., a process that subjects fibers to a twisting stress, which causes the fibers to break easily at the surface of the complete part). For example, to break fibers or remove other materials that are not surrounded by cured resin, the part may be manually scrubbed with a fine wire brush, or a light blasting process may be used (using media such as plastic pellets, which are commonly used to remove paint from plastic surfaces).

In addition, in step (e) of method 2 when step (d) is repeated, "selectively curing one or more of the thin layers" means that the thin layer or layers are cured and in the same step (e.g., at the same time or simultaneously) are also bonded to one or more previously cured layers.

Method 3

In another alternative, a fiber-reinforced thermoset part (or, more broadly, a plastic or composite part) according to the present invention may be built up by method 3: (a) laying down a thin layer (e.g., having a thickness of about 0.01 mm to about 0.5 mm, or a thickness of about 0.05 mm to about 0.4 mm, or a thickness of about 0.1 mm to about 0.25 mm, or any other suitable thickness) of a resin; (b) forming a resin-wetted layer by applying to the thin layer of resin discontinuous (e.g., chopped, etc.) fibers, continuous fibers, particles/powder (e.g., ceramic, metal, etc.), small electronic devices, any other suitable materials, and/or combinations thereof, wherein the discontinuous fibers, continuous fibers, particles/powder, small electronic devices, other suitable materials, and/or combinations thereof are wetted with the resin (e.g., by immersing the discontinuous fibers, continuous fibers, particles/powder, small electronic devices, other suitable materials, and/or combinations thereof in the resin; or by mixing the discontinuous fibers, particles/powder, small electronic devices, other suitable materials, and/or combinations thereof with the resin); (c) optionally repeating steps (a) and (b) to form another resin-wetted layer; (d) selectively curing one or more of the resin-wetted layers via an e-beam to form a cured layer or cured layers; (e) repeating steps (a) through (d) to form a new cured layer or new cured layers; and (f) optionally repeating step (e) a number of times to form the desired number of cured layers.

In step (a) of method 3, the thin layer of resin may be laid down upon a part, substrate, workpiece, or support platform (such as the movable support platform shown in FIG. 1); or the thin layer of resin may be laid down upon a cured, partially cured, or uncured (resin-wetted) layer that is supported on or comprises a portion of a part, substrate, workpiece, or support platform. In step (a) of method 3, the thin layer of resin may be laid down on the part, the substrate, the workpiece, or the support platform or on the cured, partially cured, or uncured (resin-wetted) layer by any suitable method—for example, by spraying the thin layer of resin on the part, on the substrate, on the workpiece, on the support platform, or on the cured, partially cured, or uncured (resin-wetted) layer; by lowering slightly or incrementally into a pool (or bath) comprising the resin the part, the substrate, the workpiece, the support platform, or the cured, partially cured, or uncured (resin-wetted) layer that is supported on or comprises a portion of a part, substrate, workpiece, or support platform; or by raising a pool (or bath) comprising the resin to cover or soak the part, the substrate, the workpiece, the support platform, or the cured, partially cured, or uncured (resin-wetted) layer that is supported on or comprises a portion of a part, substrate, workpiece, or support platform. In step (b) of method 3, the discontinuous fibers, continuous fibers, particles/powder, small electronic devices, other suitable materials, and/or combinations thereof may be applied to the thin layer of resin by any suitable method—for example, by placing or immersing (either partially or completely) into the thin layer of resin the discontinuous fibers, continuous fibers, particles/powder, small electronic devices, other suitable materials, and/or combinations thereof; or by spraying onto the thin layer of resin the discontinuous fibers, continuous fibers, particles/powder, small electronic devices, other suitable materials, and/or combinations thereof, wherein the spraying is optionally done with sufficient force to partially or completely soak or immerse in the resin the discontinuous fibers, continuous fibers, particles/powder, small electronic devices, other suitable materials, and/or combinations thereof.

In step (f) of method 3, step (e) may be repeated any number of times until a portion of the part is completed or until all of the part is completed (e.g., at least about one time, at least about two times, at least about three times, at least about four times, at least about five times, at least about 10 times, at least about 20 times, at least about 25 times, at least about 30 times, at least about 40 times, at least about 50 times, at least about 75 times, at least about 100 times, at least about 250 times, at least about 500 times, or any other suitable number of times).

In step (d) of method 3 and in step (e) of method 3 when step (d) is repeated, "selectively curing one or more of the resin-wetted layers" means curing those portions of the resin-wetted layer(s) that are intended to form the final part and optionally not curing some, most, or all of those portions of the resin-wetted layers that are not intended to form the final part. After step (d), (e), or (f) in method 3, some, most, or all of the uncured material optionally is removed from the part by any suitable process The uncured material includes, but is not necessarily limited to, the uncured resin and the material (such as discontinuous and continuous fibers, particles/powder, small electronic devices, and other materials) that is not surrounded by cured resin. For example, the uncured resin may be allowed to drain off of the part; or a suitable solvent or heat may be applied to the uncured resin to facilitate removal of the uncured resin. Similarly, the material that is not surrounded by cured resin may be removed from the part by any suitable process (e.g., a process that subjects fibers to a twisting stress, which causes the fibers to break easily at the surface of the complete part). For example, to break fibers or remove other materials that are not surrounded by cured resin, the part may be manually scrubbed with a fine wire brush, or a light blasting process may be used (using media such as plastic pellets, which are commonly used to remove paint from plastic surfaces).

In addition, in step (e) of method 3 when step (d) is repeated, "selectively curing one or more of the resin-wetted layers" means that the resin-wetted layer or layers are cured and in the same step (e.g., at the same time or simultaneously) are also bonded to one or more previously cured layers.

When a user prepares a fiber-reinforced thermoset part (or, more broadly, a plastic or composite part), method 1, method 2, method 3, and/or any other suitable method can be used to prepare the cured layers. Thus, different cured layers in the fiber-reinforced thermoset part can be prepared by different methods.

The curing mentioned in step (d) of method 1, step (d) of method 2, and step (d) of method 3 may be performed in at least two ways: either the resin can be only partially cured in this step, so that the resin hardens but is not fully cured (and therefore does not have maximum strength and stiffness); or the resin can be fully cured. If the resin is partially cured, then after the part has been partially or fully built up, the resin can be fully cured using conventional e-beam curing or thermal curing. (The advantage of partial curing in step (d) is that better z-direction dimensional tolerances may be attained, since it would be easier to avoid curing resin under or near the target layers that the user would like to cure. Partial curing probably would only be necessary or advantageous for selected geometries, where, for example, there are part overhangs or internal channels, etc.).

The fibers may be continuous or discontinuous. The fibers may be whiskers, fibers, tows, or rovings. The fibers in each layer may be unidirectional or multidirectional (e.g., randomly oriented or woven, braided, fabric, etc.). For example, the fabric may include multidirectional fabrics, knit or woven fabrics, and mats). The fibers may be composed of any material that is available or can be made in fibrous form, including, but not necessarily limited to, graphite, glass, Kevlar™ (aramid), alumina (a type of ceramic), metal, plastic, etc. The plastic may include Nylon™ fibers, acrylic fibers (including those used for plastic optical fibers), thermoplastic or thermoset plastic fibers, or any other suitable plastic fibers.

Discontinuous fibers may be obtained from continuous fibers by chopping down the continuous fibers on-site or by ordering discontinuous fibers from a manufacturer. Continuous fibers may extend over a substantial proportion of the plastic or composite part as a continuous length. Chopped (or more generally, discontinuous) fibers are typically shorter than about 2 cm, although there is a form of material called "Long Discontinuous Fibers (LDF)," which has a range of fiber lengths, with some fibers as long as about 13 cm.

The particles/powder described above in methods 1-3 may be any suitable size. For example, the diameter of the particles probably should not be larger than the thickness of the layer that the user wants to lay down. Thus, if the desired thickness of the layer is about 0.5 mm, then the particles should have a diameter of no more than about 0.5; and preferably the particles would have a diameter of about 0.5 micron to about 0.3 mm, or about 1 micron to about 200 microns, or about 15 microns to about 150 microns. The particles/powder can be made of any suitable material, such as a material that is dimensionally compatible with incorporation into a matrix. The particles may be made of a ceramic (such as alumina, silicon carbide, silicon nitride, etc.), carbon (such as carbon black, etc.), metal (such as iron particles, magnetic particles, etc.), glass, hollow spheres, microspheres (such as hollow or solid glass microspheres, etc.), nanotubes (such as carbon nanotubes, etc.), plastic, and platelets. The plastic may include Nylon™ particles/powder, acrylic particles/powder, thermoplastic or thermoset plastic particles/powder, or any other suitable plastic.

The matrix of the plastic or composite part made by methods 1-3 may substantially comprise an e-beam curable thermoset resin (although small portions of other materials might be blended in). The second phase (e.g., the thin layer mentioned above in method 1, the material mixed with resin in step (a) of method 2, and the material applied in step (b) of method 3) may be any suitable material or solid that is compatible with encapsulation in the resin matrix. Thus, small electronic devices could be put down as well as particles, fibers (in the form of tows, fabric, or mats), platelets, whiskers, hollow spheres, carbon nanotubes, etc. In addition, combinations of different second phases could be laid down in different layers. For example, most layers could incorporate carbon fibers, but one layer could have embedded electronic devices or a layer of magnetic particles. Of course, embedding electronic devices in one layer may not necessarily produce a plastic or composite part that has as much mechanical strength as a part that does not include embedded electronic devices in one layer.

Resins used in the present invention (e.g., in step (b) of method 1, in step (a) of method 2, or in step (a) of method 3) should be e-beam curable or substantially curable via an e-beam. There are quite a few e-beam curable resins that are commercially available, although the resins with the best properties are cationic-cured epoxies, such as those described in U.S. Pat. No. 5,877,229, which are from sources such as Applied Poleramic, Inc. and UCB Radcure (under license from Oak Ridge National Lab). (U.S. Pat. No. 5,877,229 is incorporated herein by this reference.) The second category of e-beam curable resins are free-radical initiated e-beam curable resins. Expertise in the field of polymer formulation is not required since formulators who specialize in e-beam curable polymers will supply the resin. They also can adjust some of the physical properties, such as viscosity, to aid in processing.

If a user does not know whether a polymer formulation is e-beam curable, the user would have to expose it to electron beams or gamma rays at various dosages and then determine the degree of cure (using calorimetry). The resins used in the present invention (e.g., in step (b) of method 1) may cure at a radiation dose from about 100 kGy to about 300 kGy, or about 150 kGy to about 250 kGy, or about 175 kGy to about 225 kGy.

For fiber-reinforced parts with z-direction details or simply for improved z-direction strength, short fibers (e.g., about 0.25 mm to about 1.25 mm long, or about 0.25 mm to about 1 mm long, or about 0.25 mm to about 0.5 mm long) optionally may be:

(1) selectively added to, stitched into, or included in the thin layer of step (a) or the resin-wetted layers of steps (b) and (c) prior to forming a new cured layer in step (e) of method 1;

(2) selectively added to, stitched into, or included in the mixture of step (a) or the thin layer of the mixture of step (b) prior to forming a new cured layer in step (e) of method 2; or (3) selectively added to, stitched into, or included in the thin layer of resin of step (a) or the resin-wetted layer of step (b) prior to forming a new cured layer in step (e) of method 3. Short fibers (e.g., about 0.25 mm to about 1.25 mm long, or about 0.25 mm to about 1 mm long, or about 0.25 mm to about 0.5 mm long) also optionally may be: (1) selectively added to, stitched into, or included in two or more resin-wetted layers after step (c) and before step (d) or before step (e) of method 1; (2) selectively added to, stitched into, or included in two or more thin layers after step (c) and before step (d) or before step (e) of method 2; or (3) selectively added to, stitched into, or included in two or more resin-wetted layers after step (c) and before step (d) or before step (e) of method 3. The short fibers mentioned in the preceding two sentences may act as z-direction reinforcement; and these short fibers may be selectively added to, stitched into, or included as described above to stitch adjacent cured, partially cured, or uncured layers (or plies) together using an automated arm with an x-y controller. Thus, for example, the steps described in this paragraph may be used to stitch or bind together an existing cured layer from step (d) with a new cured layer from step (e) of method 1; the steps described in this paragraph may be used to stitch or bind together an existing cured layer from step (d) with a new cured layer from step (e) of method 2; or the steps described in this paragraph may be used to stitch or bind together an existing cured layer from step (d) with a new cured layer from step (e) of method 3. The steps described in this paragraph may also be used to stitch or bind together two or more resin-wetted layers before the layers are cured in method 1 or 3; and the steps described in this paragraph may also be used to stitch or bind together two or more thin layers before the layers are cured in method 2.

This invention is novel and nonobvious in its use of selective layer-by-layer electron beam curing in combination with continuous fiber reinforcement and optional z-direction stitching. It is unique in conferring the ability to make a high-performance continuous fiber-reinforced plastic part to net or near-net shape without the need for a mold or tooling. ("Net or near-net shape" means that the part has substantially the shape and dimensions of the final part, so that very little or no machining will be required.) Using electron-beam curing allows layer-by-layer curing for the thermoset matrix even when the matrix contains a high volume fraction of fibers (e.g., above about 40% vol. %, or about 40 vol. % to about 80 vol. %, or about 40 vol. % to about 70 vol. %, or about 50 vol. % to about 70 vol. %). Introduction of short z-direction fibers gives much-improved z-direction strength.

Figure 1:
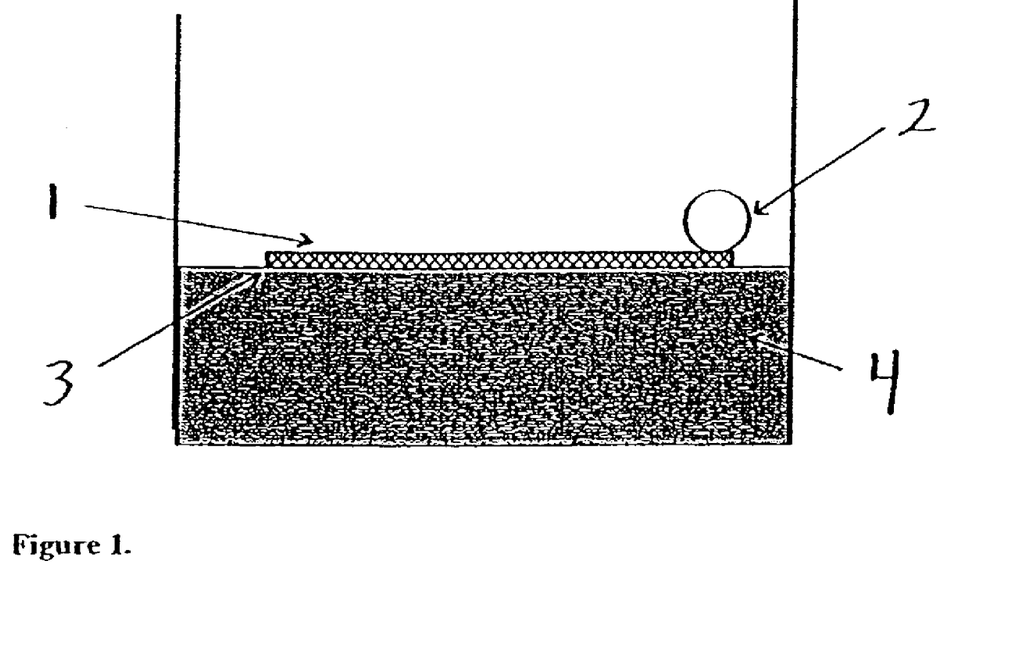
FIG. 1 shows two or three layers of fiber or fabric being rolled out on a movable support platform.

FIGS. 1 through 6 show a schematic representation of a process for making a fiber-reinforced thermoset part by incrementally lowering the part into a resin bath (alternatively, more resin could be pumped incrementally into a chamber containing the part, thereby raising the resin level) and selectively curing the layers by electron beam layer by layer. The process steps are as follows:

1. In FIG. 1, two or three layers 1 ("plies") of a unidirectional fiber or multidirectional fabric are rolled out from a roll 2 on a movable platform 3, which is stationed above a resin bath 4. The bath 4 is kept at a temperature high enough to keep the resin easily flowable (about 70° C. to about 100° C., or about 50° C. to about 120° C.)

Figure 2:
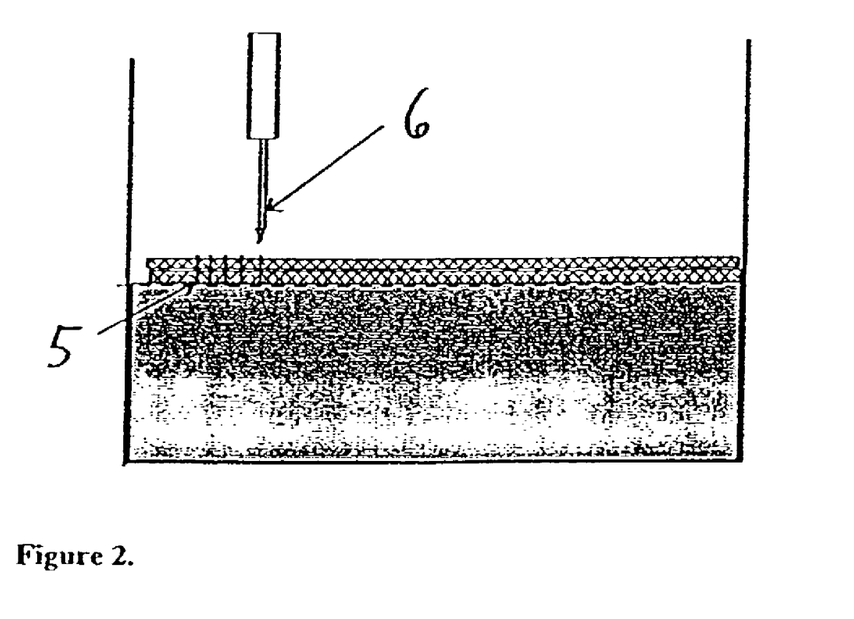
FIG. 2 shows short fibers being injected in the z-direction in selected areas.

2. In FIG. 2, short fibers 5 are optionally injected in selected areas in the spaces between fibers in the z-direction using a pneumatic fiber injector 6 on an x-y controlled arm. The length of the fibers may be the width of two, three, four, or more plies (about 0.25 to about 0.75 mm). The placement and number of fibers inserted are be determined by the mechanical requirements and shape of the part. For greater strength in the z-direction, more short fibers are injected.

Figure 3:
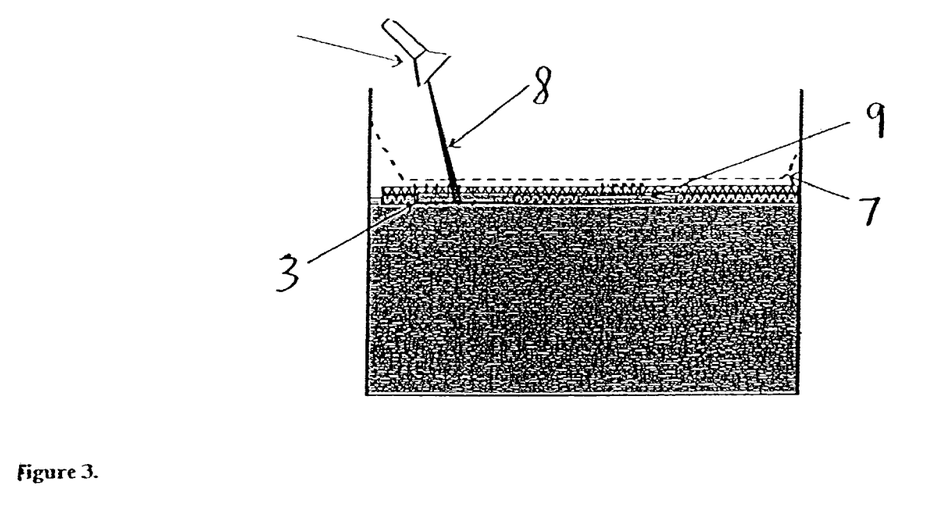

3. In FIG. 3, the platform 3 is lowered so that the bottom layer is immersed in resin or the level of the resin bath is raised so that the bottom layer is immersed in resin. Some circulation of the resin may be required to ensure that the bottom layer is fully wetted and/or to minimize or eliminate entrapped air bubbles. (The circulation may be accomplished by using a pump or any other suitable circulation means.) Optionally, an inflatable bladder 7 may be placed on the top layer and inflated before curing to compact the layers of fiber. (Of course, any other suitable compacting means could be used (e.g., a flat plate on a movable arm could probably also be used like a platen on a press if the plate were thin enough to be penetrated by the electron beam).) A bladder 7 (suspended from a frame above the work piece) works well because top layer is initially flat; and, therefore, the bladder 7 does not have to conform to a shaped contour to compact the layer under construction. (The layer under construction is the top layer that is impregnated with resin and that is not yet cured or is only partially cured.)

4. As shown in FIG. 3, a computer-controlled electron beam 8 is rastered across the layer or layers, irradiating only those areas of the layer or layers that will make up the final part. The electron beam energy can be selected based on the thickness of the layers desired; for most applications, an energy around about 400 KeV (or about 300 KeV to about 800 KeV, or about 300 KeV to about 600 KeV, or about 300 KeV to about 500 KeV) would probably be desired in order to obtain layers that are very thin or relatively thick (e.g., about 0.3 mm or less, or about 0.3 mm to about 0.75 mm, or about 0.3 mm to about 0.85 mm, or about 0.3 mm to about 0.6 mm). Thinner layers allow for more precise control of the part's final geometry. The energy of the electron beam 8 is selected so that the beam 8 penetrates the layer 10 (see FIG. 5) to be cured and part of the previous (cured, partially cured, or uncured) layer 9, ensuring good bonding between layers. (The "previous layer" is the layer 9 that is underneath or touches the layer 10 being cured or is the layer 9 on which the layer 10 being cured rests.) If an inflatable bladder 7 is used, the electron-beam energy is selected so that it can penetrate the thin elastomer layer of the bladder 7 and still cure one or two layers of the composite.

Figure 4:
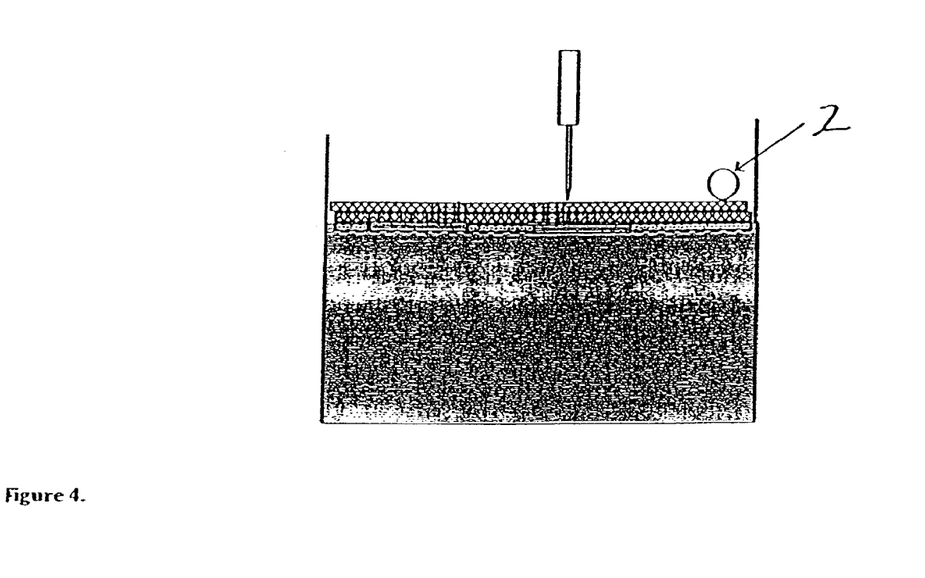
FIG. 4 shows more fiber or fabric being rolled out and shows selective stitching of adjacent dry plies with short z-direction fibers.
Figure 5:
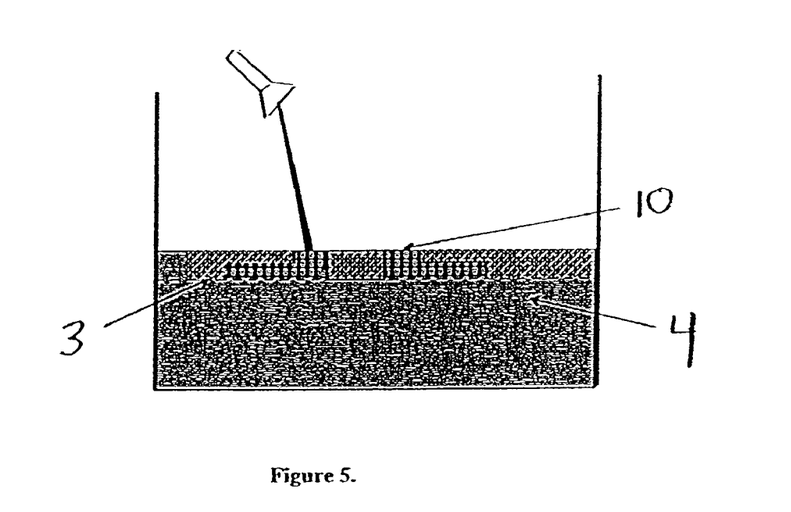
FIG. 5 shows that the shaped part is built up.

5. As shown in FIGS. 4 and 5, steps 1 through 4 are optionally repeated to build up a shaped part from thin, flat layers.

Figure 6:
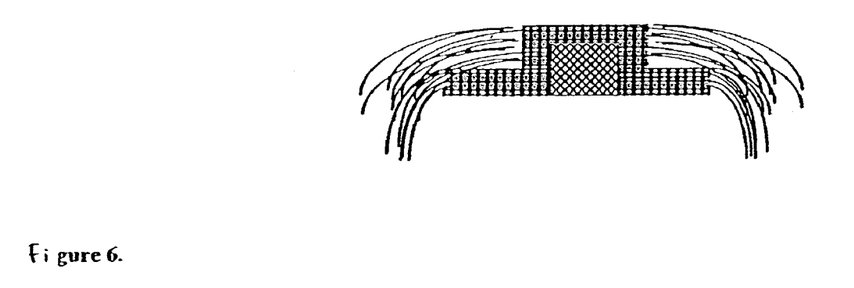
FIG. 6 shows that uncured resin is drained from the part so that loose fibers can be removed with a wire brush or by light sandblasting with plastic media.

6. When the complete part has been built up, the part is removed from the resin pool; and, as shown in FIG. 6, the uncured liquid resin may be allowed to drain off. A bath comprising a suitable solvent may be used to facilitate this process of removing the uncured liquid resin. For example, the bath may comprise acetone or any other solvent that dissolves the uncured resin, if the solvent does not attack or dissolve the cured resin. The removal of the uncured resin may also be facilitated by applying heat, since the cured resin would stay solid at temperatures that would cause the uncured resin to become a thin, runny liquid.

7. The dry fibers that are not surrounded by cured resin (and are therefore not desired as part of the finished shape) may then removed by any suitable process (e.g., a process that subjects the fibers to a twisting stress, which causes the fibers to break easily at the surface of the cured part). For example, to break the fibers, the part may be manually scrubbed with a fine wire brush, or a light blasting process may be used (using media such as plastic pellets, which are commonly used to remove paint from plastic surfaces).

This process is facilitated by currently available computer programs that automatically section three-dimensional computer-aided design files into layers, thus making programming the control software for the e-beam relatively straightforward.

Dimensional tolerances achievable in the final part will depend on control of e-beam lateral placement and e beam penetration. E-beam spot size varies depending on the distance from the e-beam gun to the work surface and on equipment parameters. Typical sizes are about 0.5 cm to about 1 cm (or about 0.5 cm to about 2 cm, or about 0.5 cm to about 3 cm) in diameter. The size of the e-beam spot may be tailored as necessary. E-beam placement is magnetically controlled and is quite precise. However, changes in spot shape due to the angle of the e-beam will have to be taken into account. E-beam penetration depth depends on the material density and on the e-beam energy.

Figure 7:
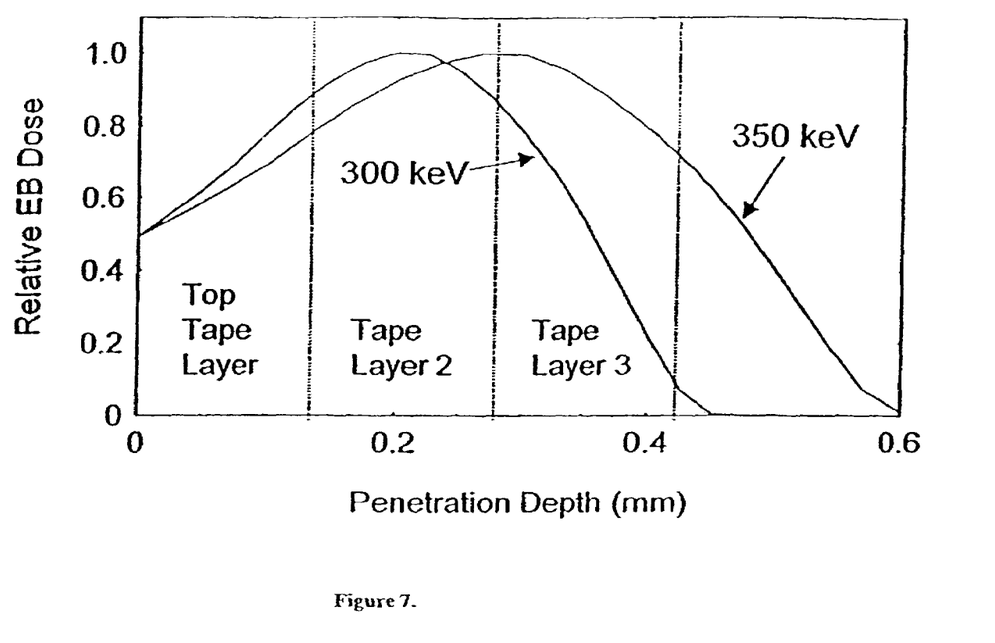
FIG. 7 shows relative electron-beam dose (the amount of radiation absorbed by the material) as a function of penetration depth for 300 keV and 350 keV electron-beam energies.

FIG. 7 shows relative electron-beam dose (the amount of radiation absorbed by the material) as a function of penetration depth for 300 keV and 350 keV electron beam energies (see Daniel L. Goodman and Catherine A. Byrne, et al., "Automated Tape Placement with In-situ Electron Beam Cure," paper presented at the 44th international SAMPE Symposium and Exhibition, May 23-27, 1999 at Long Beach, Calif.). Depending on the density of the fiber layer (fiber count, type of weave, etc.), the dry fiber layer is about 55% to about 70% as dense as a fiber layer infused with uncured resin. Therefore, the e-beam will penetrate about 40% to about 80% farther in the dry fiber layers. If a fiber layer is about 0.1 mm thick (which is typical for unidirectional fiber), then a 300 MeV beam can penetrate about two plies of dry fiber to cure two plies of immersed fiber underneath. Thicker fiber layers (e.g., woven fabric) would require somewhat higher beam energies. The beam residence time and number of passes dictate the total radiation dose and therefore the extent of the curing. Each ply may be cured using at least two passes of the electron beam—one pass after it is first immersed in resin (or after the resin layer is first applied) and a second pass after another layer above it has been freshly immersed (or after another resin layer above it has been freshly applied). This approach would ensure good ply-to-ply bonding and would also minimize or avoid inadvertent curing of layers below those being selectively cured.

For even better dimensional control, one could employ at least two intersecting beams, so that only the areas irradiated at the intersection of the beams would have a sufficient dose to be cured. This method would employ at least two, separately controlled e-beam guns set at different angles with respect to the part being built up. The scan rate and/or power of the guns would be set so that the dose from any gun alone would not be high enough to cure the resin, but the dose from both guns together (or all of the guns together) would be enough to cure the resin. In this way, only the areas exposed to e-beams from both or all guns (exposed either simultaneously or at different times) would cure. Thus, a finer control of the part dimensions may be obtained.

Some part geometries (e.g. sections with long, thin overhangs that may sag during processing) may require the incorporation of small part supports, which may be designed into the part and made from the same material as the part. Such supports can then be removed later, if necessary. Generally, internal cavities must be designed to allow drainage of the uncured resin, and, where applicable, the fiber remaining in the cavity after manufacture.

The insertion of short fibers in the z-direction of the part will significantly increase the z-direction strength and thickness, which will be especially desirable for z-direction contours (such as the wall of the hat section shown in FIG. 6). While the use of short fibers does not give strengths and stiffness as high as the use of continuous fibers, mechanical properties are nonetheless greatly improved over those for a plastic matrix alone. This is the reason why short randomly oriented fibers and particles are included in plastics to improve their mechanical properties. While inclusion of these short fibers in sections such as the vertical wall of the hat section will not give mechanical properties as high as a conventional composite, where the continuous fiber is draped over a tool and therefore is oriented in the z-direction in a vertical wall, our method allows improved z-direction properties for other sections of the part where a conventional composite would-have no fibers oriented in the z-direction.

Another, similar approach for fabrication of parts from powder or particles (e.g., ceramic, metal, etc.) is to coat the powder or particles with an e-beam curable resin, or otherwise intermingle the resin and powder or particles. Then, the powder (or particles) with the e-beam curable binder is placed in the bed and processed similarly to the method described above, using a powder-feed system that is appropriate for the flow characteristics of the powder.

As used in this application (including in the claims), the term "uncured" means "not cured at all" or "partially cured." Thus, an "uncured layer" is a layer that has not been cured at all or has been only partially cured. As used in this application (including in the claims), the term "cured" means "completely cured" or "partially cured." Thus, a "cured layer" is a layer that has completely cured or has been only partially cured.

All of the measurements set forth in this application are approximations.

The invention illustratively disclosed herein suitably may be practiced in the absence of any element which is not specifically disclosed herein.

The following claims are entitled to the broadest possible scope consistent with this application. The claims shall not necessarily be limited to the preferred embodiments or to the embodiments shown in the examples.

Article

Daniel L. Goodman and Catherine A. Byrne, et al., "Automated Tape Placement with In-situ Electron Beam Cure," paper presented at the 44th International SAMPE Symposium and Exhibition, May 23-27, 1999 at Long Beach, Calif.

The invention claimed is:

1. A method for making a composite part, the method comprising:
    (a) providing an uncured upper layer on a part, a substrate, a workpiece, a support platform, or a base layer, wherein the uncured upper layer comprises resin and also comprises fibers, particles, powder, and/or electronic devices;
    (b) providing a new uncured upper layer on the uncured upper layer provided in step (a), whereby the uncured upper layer provided in step (a) becomes an uncured lower layer, and wherein the new uncured upper layer comprises resin and also comprises fibers, particles, powder, and/or electronic devices;

(c) after step (b) selectively curing using an electron beam one or more selected portions of the uncured upper layer and/or the uncured lower layer;

(d) after step (c), providing a new uncured upper layer on the cured or uncured upper layer from step (c), whereby the cured or uncured upper layer from step (c) becomes a cured or uncured lower layer, and wherein the new uncured upper layer comprises resin and also comprises fibers, particles, powder, and/or electronic devices;

(e) if the lower layer resulting from step (d) is uncured, selectively curing one or more selected portions of the lower layer resulting from step (d) to yield a cured lower layer that is bonded to one or more previously cured layers;

(f) after step (e), providing a new uncured upper layer on the uncured upper layer provided in step (d), whereby the uncured upper layer provided in step (d) becomes an uncured lower layer, and wherein the new uncured upper layer comprises resin and also comprises fibers, particles, powder, and/or electronic devices;

(g) after step (f) selectively curing using an electron beam one or more portions of the uncured upper layer and/or the uncured lower layer(s) after step (f) to yield at least one newly cured layer that is bonded to one or more previously cured layers;

(h) repeating steps (d) through (g) a number of times to form the composite part, wherein the composite part has a desired number of cured layers; and (i) optionally removing from the composite part at least some uncured portions.

2. A method as claimed in claim 1, wherein the upper and lower layers are nonmetallic layers.

3. A method as claimed in claim 1, wherein the upper and lower layers are not made of metal.

4. A method as claimed in claim 1, wherein the upper and lower layers are not metallic foil.

5. A method as claimed in claim 1, wherein step (c) comprises curing the uncured lower layer.

6. A method as claimed in claim 1, wherein step (g) comprises curing the uncured lower layer(s).

7. A method as claimed in claim 5, wherein step (g) comprises curing the uncured lower layer(s).

8. A method as claimed in claim 5, wherein step (c) further comprises curing the uncured upper layer.

9. A method as claimed in claim 6, wherein step (g) further comprises curing the uncured upper layer.

10. A method as claimed in claim 7, wherein step (c) further comprises curing the uncured upper layer, and wherein step (g) further comprises-curing the uncured upper layer.

11. A method as claimed in claim 1, wherein step (h) comprises repeating steps (d) through (g) at least about five times.

12. A method as claimed in claim 7, wherein step (h) comprises repeating steps (d) through (g) at least about five times.

13. A method as claimed in claim 1, wherein step (h) comprises repeating steps (d) through (g) at least about 25 times.

14. A method as claimed in claim 7, wherein step (h) comprises repeating steps (d) through (g) at least about 25 times.

15. A method as claimed in claim 1, wherein providing the uncured upper layer in step (a) comprises:

(1) laying down a first layer comprising fibers, particles, powder, and/or electronic devices on the part, the substrate, the workpiece, the support platform, or the base layer, and (2) applying resin to the first layer to form the uncured upper layer.

16. A method as claimed in claim 1, wherein providing the new uncured upper layer in step (f) comprises:

(1) laying down a second layer of fibers, particles, powder, and/or electronic devices on the uncured layer provided in step (d); and (2) applying resin to the second layer to form the new uncured upper layer.

17. A method as claimed in claim 15, wherein providing the new uncured upper layer in step (f) comprises:

(1) laying down a second layer of fibers, particles, powder, and/or electronic devices on the uncured layer provided in step (d); and (2) applying resin to the second layer to form the new uncured upper layer.

18. A method as claimed in claim 1, wherein providing the uncured upper layer in step (a) comprises: applying a first layer of a mixture on the part, the substrate, the workpiece, the support platform, or the base layer, wherein the mixture comprises resin and also comprises fibers, particles, powder, and/or electronic devices.

19. A method as claimed in claim 18, wherein applying the first layer of the mixture comprises spraying, rolling, or brushing the mixture onto the part, the substrate, the workpiece, the support platform, or the base layer.

20. A method as claimed in claim 1, wherein providing the new uncured upper layer in step (f) comprises: applying a second layer of a mixture on the part, the substrate, the workpiece, the support platform, or the base layer, wherein the mixture comprises resin and also comprises fibers, particles, powder, and/or electronic devices.

21. A method as claimed in claim 20, wherein applying the second layer of the-mixture comprises spraying, rolling, or brushing the mixture onto the part, the substrate, the workpiece, the support platform, or the base layer.

22. A method as claimed in claim 18, wherein providing the new uncured upper layer in step (f) comprises: applying a second layer of a mixture on the part, the substrate, the workpiece, the support platform, or the base layer, wherein the mixture comprises resin and also comprises fibers, particles, powder, and/or electronic devices.

23. A method as claimed in claim 19, wherein providing the new uncured upper layer in step (f) comprises: applying a second layer of a mixture on the part, the substrate, the workpiece, the support platform, or the base layer, wherein the mixture comprises resin and also comprises fibers, particles, powder, and/or electronic devices; and wherein applying the second layer of the mixture comprises spraying, rolling, or brushing the mixture onto the part, the substrate, the workpiece, the support platform, or the base layer.

24. A method as claimed in claim 1, wherein providing the uncured upper layer in step (a) comprises:

(1) laying down a first layer comprising resin on the part, the substrate, the workpiece, the support platform, or the base layer; and (2) applying fibers, particles, powder, and/or electronic devices to the first layer to form the uncured upper layer.

25. A method as claimed in claim 1, wherein providing the new uncured upper layer in step (f) comprises:

(1) laying down a second layer comprising resin on the part, the substrate, the workpiece, the support platform, or the base layer; and
(2) applying fibers, particles, powder, and/or electronic devices to the second layer to form the new uncured upper layer.

26. A method as claimed in claim 24, wherein providing the new uncured upper layer in step (f) comprises:
(1) laying down a second layer comprising resin on the part, the substrate, the workpiece, the support platform, or the base layer; and
(2) applying fibers, particles, powder, and/or electronic devices to the second layer to form the new uncured upper layer.

27. A method as claimed in claim 1, wherein step (g) comprises curing the uncured lower layer resulting from step (f) to yield a cured lower layer that is bonded to a previously cured lower layer.

28. A method as claimed in claim 1, wherein the uncured upper layer in step (c) has a first length in an x direction, a first width in a y direction, and a first depth in a z direction, and
wherein the uncured upper layer in step (c) further comprises fibers in the resin generally in the z direction; and
wherein the uncured upper layer in step (g) has a second length in the x direction, a second width in the y direction, and a second depth in the z direction, and
wherein the uncured upper layer in step (g) further comprises fibers in the resin generally in the z direction.

29. A method as claimed in claim 1, wherein the uncured lower layer instep (c) has a third length in an x direction, a third width in a y direction, and a third depth in a z direction, and
wherein the uncured lower layer in step (c) further comprises fibers in the resin generally in the z direction; and
wherein the uncured lower layer in step (g) has a fourth length in the x direction, a fourth width in the y direction, and a fourth depth in the z direction, and
wherein the uncured lower layer in step (g) further comprises fibers in the resin generally in the z direction.

30. A method as claimed in claim 28, wherein the uncured lower layer in step (c) has a third length in the x direction, a third width in the y direction, and a third depth in the z direction, and
wherein the uncured lower layer in step (c) further comprises fibers in the resin generally in the z direction; and
wherein the uncured lower layer in step (g) has a fourth length in the x direction, a fourth width in the y direction, and a fourth depth in the z direction, and
wherein the uncured lower layer in step (g) further comprises fibers in the resin generally in the z direction.

31. A method as claimed in claim 1, wherein the uncured upper layer in step (c) has a first length in an x direction, a first width in a y direction, and a first depth in a z direction, and
wherein the uncured upper layer in step (c) further comprises fibers in the resin generally in the z direction; and
wherein the uncured upper layer in step (g) has a second length in the x direction, a second width in the y direction, and a second depth in the z direction, and
wherein the uncured upper layer in step (g) further comprises fibers in the resin generally in the z direction;
wherein the uncured lower layer in step (c) has a third length in the x direction, a third width in the y direction, and a third depth in the z direction, and
wherein the uncured lower layer in step (c) further comprises fibers in the resin generally in the z direction; and
wherein the uncured lower layer in step (g) has a fourth length in the x direction, a fourth width in the y direction, and a fourth depth in the z direction, and
wherein the uncured lower layer in step (g) optionally further comprises fibers in the resin generally in the z direction;
wherein step (g) comprises curing the uncured lower layer resulting from step (f) to yield a cured lower layer that is bonded to a previously cured lower layer and that is also connected to the previously cured lower layer by the fibers in the z direction;
wherein the z direction is generally perpendicular to booth the x direction and the y direction; and
wherein the x direction is generally perpendicular to the y direction.

32. A method as claimed in claim 28, wherein the composite part optionally has a tensile strength of about 500 MPa to about 3,000 MPa in a direction generally parallel to the fibers in the z direction;
wherein the composite part optionally has a tensile modulus of about 50 GPa to about 220 GPa in a direction generally parallel to the fibers in the z direction; and
wherein the composite part optionally has a flexural strength of about 600 MPa to about 2,000 MPa in a direction generally parallel to the fibers in the z direction.

33. A method as claimed in claim 30, wherein the composite part optionally has a tensile strength of about 500 MPa to about 3,000 MPa in a direction generally parallel to the fibers in the z direction;
wherein the composite part optionally has a tensile modulus of about 50 GPa to about 220 GPa in a direction generally parallel to the fibers in the z direction; and
wherein the composite part optionally has a flexural strength of about 600 MPa to about 2,000 MPa in a direction generally parallel to the fibers in the z direction.

34. A method as claimed in claim 30, wherein the composite part has a tensile strength of about 500 MPa to about 3,000 MPa in a direction generally parallel to the fibers in the z direction;
wherein the composite part has a tensile modulus of about 50 GPa to about 220 GPa in a direction generally parallel to the fibers in the z direction; and
wherein the composite part has a flexural strength of about 600 MPa to about 2,000 MPa in a direction generally parallel to the fibers in the z direction.

35. A method as claimed in claim 1, wherein the composite part includes a portion that is generally not flat.

36. A method as claimed in claim 1, wherein the composite part is not a cube or rectangular solid.

37. A method as claimed in claim 1, wherein the composite part has one or more curved surfaces.

38. A method as claimed in claim 1, wherein the composite part includes a portion that is at least partially cylindrical, spherical, pyramidal, conical, curved, or nonflat.

39. A method as claimed in claim 1, wherein each uncured layer has a length in a x direction, a width in a y direction, and a depth in a z direction;
wherein the composite part has a length in the x direction, a width in the y direction, and a depth in the z direction;
wherein the x direction is generally perpendicular to the y direction; and
wherein the z direction is generally perpendicular to both the x direction and the y direction; and wherein the length of one or more of the uncured layers is greater than the length of the composite part, and/or
wherein the width of one or more of the uncured layers is greater than the width of the composite part, and/or
wherein the depth of one or more of the uncured layers is greater than the depth of the composite part.

40. A method as claimed in claim 1, wherein each uncured layer has a length in a x direction, a width in a y direction, and a depth in a z direction;
   wherein the composite part has a length in the x direction, a width in the y direction, and a depth in the z direction;
   wherein the x direction is generally perpendicular to the y direction; and
   wherein the z direction is generally perpendicular to both the x direction and the y direction; and
   wherein the lengths of most of the uncured layers are greater than the length of the composite part, and/or
   wherein the widths of most of the uncured layers are greater than the width of the composite part, and/or
   wherein the depths of most of the uncured layers are greater than the depth of the composite part.

41. A method for making a composite part, the method comprising:
   (a) providing an uncured upper layer on a part, a substrate, a workpiece, a support platform, or a base layer, wherein the uncured upper layer comprises resin and also comprises fibers, particles, powder, and/or electronic devices;
   (b) providing a new uncured upper layer on the uncured upper layer provided in step (a), whereby the uncured upper layer provided in step (a) becomes an uncured lower layer, and wherein the new uncured upper layer comprises resin and also comprises fibers, particles, powder, and/or electronic devices;
   (c) curing the uncured upper layer and/or the uncured lower layer after step (b) using an electron beam;
   (d) after step (c), providing a new uncured upper layer on the cured or uncured upper layer from step (c), whereby the cured or uncured upper layer from step (c) becomes a cured or uncured lower layer, and wherein the new uncured upper layer comprises resin and also comprises fibers, particles, powder, and/or electronic devices;
   (e) curing the lower layer resulting from step (d) if the lower layer is uncured to yield a cured lower layer;
   (f) after step (e) curing the uncured upper layer using an electron beam; and
   (g) repeating steps (d) through (f) a number of times to form a desired number of cured layers;
   wherein the uncured upper layer in step (c) has a first length in an x direction, a first width in a y direction, and a first depth in a z direction, and wherein the uncured upper layer in step (c) further comprises fibers in the resin generally in the z direction; wherein the uncured upper layer in step (g) has a second length in the x direction, a second width in the y direction, and a second depth in the z direction, and wherein the uncured upper layer in step (f) further comprises fibers in the resin generally in the z direction; wherein the uncured lower layer in step (c) has a third length in the x direction, a third width in the y direction, and a third depth in the z direction, and wherein the uncured lower layer in step (c) further comprises fibers in the resin generally in the z direction; wherein step (f) yields a cured upper layer that is bonded to the cured lower layer and that is also connected to the cured lower layer by the fibers in the z direction; wherein the z direction is generally perpendicular to both the x direction and the y direction; and wherein the x direction is generally perpendicular to the y direction.

42. A method for making a composite part, the method comprising:
   (a) providing an uncured upper layer on a part, a substrate, a workpiece, a support platform, or a base layer, wherein the uncured upper layer comprises resin and also comprises fibers, particles, powder, and/or electronic devices;
   (b) curing the uncured upper layer using an electron beam;
   (c) after step (b), providing a new uncured upper layer on the cured upper layer from step (b), whereby the cured upper layer from step (b) becomes a cured lower layer, and wherein the new uncured upper layer comprises resin and also comprises fibers, particles, powder, and/or electronic devices;
   (d) after step (c) curing the uncured upper layer using an electron beam; and
   (e) repeating steps (c) through (d) a number of times to form a desired number of cured layers;
   wherein the uncured upper layer in step (b) has a first length in an x direction, a first width in a y direction, and a first depth in a z direction, and wherein the uncured upper layer in step (b) further comprises fibers in the resin generally in the z direction; and wherein the uncured upper layer in step (d) has a second length in the x direction, a second width in the y direction, and a second depth in the z direction, and wherein the uncured upper layer in step (d) further comprises fibers in the resin generally in the z direction; wherein step (d) yields a cured upper layer that is bonded to the cured lower layer and that is also connected to the cured lower layer by the fibers in the z direction; wherein the z direction is generally perpendicular to both the x direction and the y direction; and wherein the x direction is generally perpendicular to the y direction.

43. A method for making a composite part, the method comprising:
   (a) providing an uncured upper layer on a part, a substrate, a workpiece, a support platform, or a base layer, wherein the uncured upper layer comprises resin and also comprises fibers, particles, powder, and/or electronic devices;
   (b) providing a new uncured upper layer on the uncured upper layer provided in step (a), whereby the uncured upper layer provided in step (a) becomes an uncured lower layer, and wherein the new uncured upper layer comprises resin and also comprises fibers, particles, powder, and/or electronic devices;
   (c) curing the uncured upper layer and/or the uncured lower layer after step (b) using an electron beam;
   (d) after step (c), providing a new uncured upper layer on the cured or uncured upper layer from step (c), whereby the cured or uncured upper layer from step (c) becomes a cured or uncured lower layer, and wherein the new uncured upper layer comprises resin and also comprises fibers, particles, powder, and/or electronic devices;
   (e) curing the lower layer resulting from step (d) if the lower layer is uncured to yield a cured lower layer;
   (f) after step (e), providing a new uncured upper layer on the uncured upper layer provided in step (d), whereby the uncured upper layer provided in step (d) becomes an uncured lower layer, and wherein the new uncured upper layer comprises resin and also comprises fibers, particles, powder, and/or electronic devices;

(g) after step (f) curing the uncured upper layer and/or the uncured lower layer(s) after step (f) using an electron beam; and (h) repeating steps (d) through (g) a number of times to form a desired number of cured layers;

wherein the uncured upper layer in step (c) has a first length in an x direction, a first width in a y direction, and a first depth in a z direction, and wherein the uncured upper layer in step (c) further comprises fibers in the resin generally in the z direction; and wherein the uncured upper layer in step (g) has a second length in the x direction, a second width in the y direction, and a second depth in the z direction, and wherein the uncured upper layer in step (g) optionally further comprises fibers in the resin generally in the z direction; wherein the uncured lower layer in step (c) has a third length in the x direction, a third width in the y direction, and a third depth in the z direction, and wherein the uncured lower layer in step (c) further comprises fibers in the resin generally in the z direction; and wherein the uncured lower layer in step (g) has a fourth length in the x direction, a fourth width in the y direction, and a fourth depth in the z direction, and wherein the uncured lower layer in step (g) further comprises fibers in the resin generally in the z-direction; wherein step (g) comprises curing the uncured lower layer resulting from step (f) to yield a cured lower layer that is bonded to a previously cured lower layer and that is also connected to the previously cured lower layer by the fibers in the z direction; wherein the z direction is generally perpendicular to both the x direction and the y direction; and wherein the x direction is generally perpendicular to the y direction.

44. A method as claimed in claim 41, wherein the x direction and the y direction form an angle of about 70° to about 110°, wherein the x direction and the z direction form an angle of about 70° to about 110°, and wherein the y direction and the z direction form an angle of about 70° to about 110°.

45. A method as claimed in claim 41, wherein the x direction and the y direction form an angle of about 85° to about 95°, wherein the x direction and the z direction form an angle of about 85° to about 95°, and wherein the y direction and the z direction form an angle of about 85° to about 95°.

46. A method as claimed in claim 42, wherein the x direction and the y direction form an angle of about 70° to about 110°, wherein the x direction and the z direction form an angle of about 70° to about 110°, and wherein the y direction and the z direction form an angle of about 70° to about 110°.

47. A method as claimed in claim 42, wherein the x direction and the y direction form an angle of about 85° to about 95° wherein the x direction and the z direction form an angle of about 85° to about 95° and wherein the y direction and the z direction form an angle of about 85° to about 95°.

48. A method as claimed in claim 43, wherein the x direction and the y direction form an angle of about 70° to about 110°, wherein the x direction and the z direction form an angle of about 70° to about 110°, and wherein the y direction and the z direction form an angle of about 70° to about 110°.

49. A method as claimed in claim 43, wherein the x direction and the y direction form an angle of about 85° to about 95°, wherein the x direction and the z direction form an angle of about 85° to about 95°, and wherein the y direction and the z direction form an angle of about 85° to about 95°.

50. A method for making a composite part, the method comprising:
(a) providing an uncured upper layer on a part, a substrate, a workpiece, a support platform, or a base layer, wherein the uncured upper layer comprises resin and also comprises. fibers, particles, powder, and/or electronic devices;
(b) providing a new uncured upper layer on the uncured upper layer provided in step (a), whereby the uncured upper layer provided in step (a) becomes an uncured lower layer, and wherein the new uncured upper layer comprises resin and also comprises fibers, particles, powder, and/or electronic devices;
(c) curing the uncured upper layer and/or the uncured lower layer after step (b) using an electron beam;
(d) after step (c), providing a new uncured upper layer on the cured or uncured upper layer, whereby the cured or uncured upper layer becomes a cured or uncured lower layer, and wherein the new uncured upper layer comprises resin and also comprises fibers, particles, powder, and/or electronic devices;
(e) curing the lower layer resulting from step (d) if the lower layer is uncured to yield a cured lower layer;
(f) after step (e), providing a new uncured upper layer on the uncured upper layer provided in step (d), whereby the uncured upper layer provided in step (d) becomes an uncured lower layer, and wherein the new uncured upper layer comprises resin and also comprises fibers, particles, powder, and/or electronic devices;
(g) after step (f) curing the uncured upper layer and/or the uncured lower layer(s) after step (f) using an electron beam; and (h) repeating steps (d) through (g) a number of times to form a desired number of cured layers; wherein at least the uncured upper layer in step (a), the new uncured upper layer in step (b), the new uncured upper layer in step (d), or the new uncured upper layer in step (f) comprises electronic devices.

51. A method as claimed in claim 1, wherein at least the uncured upper layer in step (a), the new uncured upper layer in step (b), the new uncured upper layer in step (d), or the new uncured upper layer in step (f) comprises electronic devices.

52. A method as-claimed in claim 41, wherein at least the uncured upper layer in step (a), the new uncured upper layer in step (b), the new uncured upper layer in step (d), or the new uncured upper layer in step (f) comprises electronic devices.

53. A method as claimed in claim 42, wherein at least the uncured upper layer in step (a) or the new uncured upper layer in step (c) comprises electronic devices.

54. A method as claimed in claim 43, wherein at least the uncured upper layer in step (a), the new uncured upper layer in step (b), the new uncured upper layer in step (d), or the new uncured upper layer in step (f) comprises electronic devices.

55. A method for making a composite part, the method comprising:
(a) providing an uncured upper layer on a part, a substrate, a workpiece, a support platform, or a base layer, wherein the uncured upper layer comprises resin and also comprises fibers, particles, powder, and/or electronic devices;
(b) providing a new uncured upper layer on the uncured upper layer provided in step (a), whereby the uncured upper layer provided in step (a) becomes an uncured lower layer, and wherein the new uncured upper layer comprises resin and also comprises fibers, particles, powder, and/or electronic devices;

(c) curing the uncured upper layer and/or the uncured lower layer after step (b) using an electron beam;

(d) after step (c), providing a new uncured upper layer on the cured or uncured upper layer from step (c), whereby the cured or uncured upper layer from step (c) becomes a cured or uncured lower layer, and wherein the new uncured upper layer comprises resin and also comprises fibers, particles, powder, and/or electronic devices;

(e) curing the lower layer resulting from step (d) if the lower layer is uncured to yield a cured lower layer;

(f) after step (e), providing a new uncured upper layer on the uncured upper layer provided in step (d), whereby the uncured upper layer provided in step (d) becomes an uncured lower layer, and wherein the new uncured upper layer comprises resin and also comprises fibers, particles, powder, and/or electronic devices;

(g) after step (f) curing the uncured upper layer and/or the uncured lower layer(s) after step (f) using an electron beam; and (h) repeating steps (d) through (g) a number of times to form a desired number of cured layers; wherein at least the uncured upper layer in step (a), the new uncured upper layer in step (b), the new uncured upper layer in step (d), or the new uncured upper layer in step (f) is nonmetallic.

56. A method as claimed in claim 55, wherein at least the uncured upper layer in step (a), the new uncured upper layer in step (b), the new uncured upper layer in step (d), or the new uncured upper layer in step (f) does not comprise metallic foil.

57. A method as claimed in claim 55, wherein the uncured upper layer in step (a), the new uncured upper layer in step (b), the new uncured upper layer in step (d), and the new uncured upper layer in step (f) are nonmetallic.

58. A method as claimed in claim 55, wherein the uncured upper layer in step (a), the new uncured upper layer in step (b), the new uncured upper layer in step (d), and the new uncured upper layer in step (f) do not comprise metallic foil.

59. A method as claimed in claim 41, wherein at least the uncured upper layer in step (a), the new uncured upper layer in step (b), the new uncured upper layer in step (d), or the new uncured upper layer in step (f) is nonmetallic.

60. A method as claimed in claim 42, wherein at least the uncured upper layer in step (a) or the new uncured upper layer in step (c) is nonmetallic.

61. A method as claimed in claim 43, wherein at least the uncured upper layer in step (a), the new uncured upper layer in step (b), the new uncured upper layer in step (d), or the new uncured upper layer in step (f) is nonmetallic.

62. A method as claimed in claim 50, wherein at least the uncured upper layer in step (a), the new uncured upper layer in step (b), the new uncured upper layer in step (d), or the new uncured upper layer in step (f) is nonmetallic.

63. A method as claimed in claim 1, wherein each uncured layer has a length in a x direction, a width in a y direction, and a depth in a z direction;
   wherein the composite part has a length in the x direction, a width in the y direction, and a depth in the z direction;
   wherein the x direction is generally perpendicular to the y direction; and
   wherein the z direction is generally perpendicular to both the x direction and the y direction; and
   wherein the length of one or more of the uncured layers is at least about 1 cm. greater than the length of the composite part and/or
   wherein the width of one or more of the uncured layers is at least about 1 cm. greater than the width of the composite part, and/or
   wherein the depth of one or more of the uncured layers is at least about 1 cm. greater than the depth of the composite part.

64. A method as claimed in claim 1, wherein each uncured layer has a length in a x direction, a width in a y direction, and a depth in a z direction;
   wherein the composite part has a length in the x direction, a width in the y direction, and a depth in the z direction;
   wherein the x direction is generally perpendicular to the y direction; and
   wherein the z direction is generally perpendicular to both the x direction and the y direction; and
   wherein the lengths of most of the uncured layers are at least about 1 cm. greater than the length of the composite part, and/or
   wherein the widths of most of the uncured layers are at least about 1 cm. greater than the width of the composite part, and/or
   wherein the depths of most of the uncured layers are at least about 1 cm. greater than the depth of the composite part.

65. A method as claimed in claim 1 wherein each uncured layer has a length in a x direction, a width in a y direction, and a depth in a z direction;
   wherein the composite part has a length in the x direction, a width in the y direction, and a depth in the z direction;
   wherein the x direction is generally perpendicular to the y direction; and
   wherein the z direction is generally perpendicular to both the x direction and the y direction; and
   wherein the length of one or more of the uncured layers is at least about 5 cm. greater than the length of the composite part, and/or
   wherein the width of one or more of the uncured layers is at least about 5 cm. greater than the width of the composite part, and/or
   wherein the depth of one or more of the uncured layers is at least about 5 cm. greater than the depth of the composite part.

66. A method as claimed in claim 1, wherein each uncured layer has a length in a x direction, a width in a y direction, and a depth in a z direction;
   wherein the composite part has a length in the x direction, a width in the y direction, and a depth in the z direction;
   wherein the x direction is generally perpendicular to the y direction; and
   wherein the z direction is generally perpendicular to both the x direction and the y direction; and
   wherein the lengths of most of the uncured layers are at least about 5 cm. greater than the length of the composite part, and/or
   wherein the widths of most of the uncured layers are at least about 5 cm. greater than the width of the composite part, and/or
   wherein the depths of most of the uncured layers are at least about 5 cm. greater than the depth of the composite part.

67. A method as claimed in claim 1, wherein each uncured layer has a length in a x direction, a width in a y direction, and a depth in a z direction;

wherein the composite part has a length in the x direction, a width in the y direction, and a depth in the z direction;

wherein the x direction is generally perpendicular to the y direction; and wherein the z direction is generally perpendicular to both the x direction and the y direction; and wherein the length of one or more of the uncured layers is at least about 10 cm. greater than the length of the composite part, and/or wherein the width of one or more of the uncured layers is at least about 10 cm. greater than the width of the composite part, and/or wherein the depth of one or more of the uncured layers is at least about 10 cm. greater than the depth of the composite part.

68. A method as claimed in claim 1, wherein each uncured layer has a length in a x direction, a width in a y direction, and a depth in a z direction;

wherein the composite part has a length in the x direction, a width in the y direction, and a depth in the z direction;

wherein the x direction is generally perpendicular to the y direction; and wherein the z direction is generally perpendicular to both the x direction and the y direction; and wherein the lengths of most of the uncured layers are at least about 10 cm. greater than the length of the composite part, and/or wherein the widths of most of the uncured layers are at least about 10 cm. greater than the width of the composite part, and/or wherein the depths of most of the uncured layers are at least about 10 cm. greater than the depth of the composite part.

69. A method as claimed in claim 1, wherein each uncured layer has a length in a x direction, a width in a y direction, and a depth in a z direction;

wherein the composite part has a length in the x direction, a width in the y direction, and a depth in the z direction;

wherein the x direction is generally perpendicular to the y direction; and wherein the z direction is generally perpendicular to both the x direction and the y direction; and wherein the length of one or more of the uncured layers is at least about 25 cm. greater than the length of the composite part, and/or wherein the width of one or more of the uncured layers is at least about 25 cm. greater than the width of the composite part, and/or wherein the depth of one or more of the uncured layers is at least about 25 cm. greater than the depth of the composite part.

70. A method as claimed in claim 1, wherein each uncured layer has a length in a x direction, a width in a y direction, and a depth in a z direction;

wherein the composite part has a length in the x direction, a width in the y direction, and a depth in the z direction;

wherein the x direction is generally perpendicular to the y direction; and wherein the z direction is generally perpendicular to both the x direction and the y direction; and wherein the lengths of most of the uncured layers are at least about 25 cm. greater than the length of the composite part, and/or wherein the widths of most of the uncured layers are at least about 25 cm. greater than the width of the composite part, and/or wherein the depths of most of the uncured layers are at least about 25 cm. greater than the depth of the composite part.

* * * * *